United States Patent [19]

Timoney

[11] 4,315,556
[45] Feb. 16, 1982

[54] HUB REDUCTION GEAR UNIT

[76] Inventor: Seamus G. Timoney, Harvieston, Cunningham Rd., Dalkey, County Dublin, Ireland

[21] Appl. No.: 125,314

[22] Filed: Feb. 28, 1980

[51] Int. Cl.³ .......................... B60K 17/30; F16H 3/44
[52] U.S. Cl. ...................................... 180/255; 74/801
[58] Field of Search .................. 180/255, 253; 74/789, 74/792, 801

[56] References Cited

U.S. PATENT DOCUMENTS

| | | | |
|---|---|---|---|
| 3,259,995 | 7/1966 | Bennett et al. | 74/801 |
| 3,381,548 | 5/1968 | Wolkenstein | 74/801 |
| 3,757,608 | 9/1973 | Willner | 74/801 |

FOREIGN PATENT DOCUMENTS 972334 10/1964 United Kingdom ................ 180/255

Primary Examiner—Joseph F. Peters, Jr.
Assistant Examiner—Donn McGiehan
Attorney, Agent, or Firm—Sughrue, Mion, Zinn, Macpeak and Seas

[57] ABSTRACT

A hub reduction gear drive unit for mounting in a hub of a vehicle. Essentially, the hub reduction gear unit comprises an epicyclic gear train in which the planet gear carrier is retained stationary so that the planet gear carrier also forms a hub axle and may be manufactured from a low cost robust casting. The sun gear and sun gear shaft are driven which in turn drives the annulus gear, fast on the hub through the planet gears.

8 Claims, 4 Drawing Figures

HUB REDUCTION GEAR UNIT

BACKGROUND OF THE INVENTION

1. Field of the Invention

The present invention relates to a hub reduction gear drive unit including epicyclic gearing for mounting in a hub of a vehicle, for example, a road vehicle, tractor, off-highway vehicle or the like vehicle.

2. Description of Prior Art

Where it is necessary to drive a hub whether steerable or not at a reduced speed relative to that of its drive shaft it is well known to provide an epicyclic gear train in the hub. In such cases, the drive is delivered from the vehicle transmission through a drive shaft, commonly referred to as a half shaft, which is rotatable in a stationary hollow axle. A sun gear on the drive shaft meshing with planet gears drives the hub through a planet gear carrier fast on the hub. The planet gears mesh with a stationary annulus gear fast on the axle. Because of this construction, in general, it is essential that the hub be rotatably supported on the stationary axle on bearings which are mounted on the periphery of the axle. Accordingly, this imposes a restriction on the cross-sectional area of the axle where the bearings are supported. Therefore, in order that the axle be of adequate strength it is either formed from a steel forging or pressings welded together.

This does not present problems in the case of large volume production. However, because of the high cost of tooling for either forging or pressing, it is not economically feasible to make such an axle for small volume production, and in general, in such cases epicyclic gear trains cannot be used.

OBJECTS OF THE INVENTION

The object of the present invention is to provide a hub reduction gear unit including epicyclic gearing of relatively compact size which can be readily and easily mounted within a steerable or non-steerable hub, and in which it is not necessary to have a hollow stationary forged or pressed steel axle for rotatably mounting the hub.

Another object of the invention is to provide a hub reduction gear unit in which the hub is mounted on a hub axle provided by a relatively low cost casting.

A further object of the invention is to provide a hub in which the hub axle is integral with the epicyclic gear train.

A still further object of the invention is to provide a hub reduction gear unit in which the planet gear carrier can be a relatively low cost casting and still have adequate mechanical strength.

It is also an object of the present invention to provide a hub reduction gear unit of relatively simple construction for mounting in a hub.

SUMMARY OF THE INVENTION

According to the invention there is provided a hub reduction gear unit for mounting in a hub of a vehicle to transmit drive from a drive shaft to the hub comprising:
a non-rotating epicyclic planet gear carrier adapted for rotatably supporting the hub,
a sun gear shaft coaxial with and rotatable within the planet gear carrier,
a sun gear fast on the sun gear shaft,
planet gears meshing with the sun gear and rotatably mounted on the planet gear carrier,
an annulus gear meshing with the planet gears fast on and coaxial with the hub,
a mounting means on the planet gear carrier to connect the carrier to the vehicle, and
a connecting means on the sun gear shaft to connect the sun gear shaft to the drive shaft.

In one embodiment of the invention the hub mounting means includes a pivot joint, and the connecting means includes a universal joint, both joints defining a common pivot axis transverse to the sun gear shaft for steering of the vehicle.

In another embodiment of the invention the hub is rotatably mounted on a hub axle projecting from the planet gear carrier into the hub.

Because of its relatively compact size, the hub reduction gear unit of the present invention is suitable for mounting in a hub. It is particularly suitable for mounting in a steerable hub, for example, a steerable hub of a road vehicle, tractor or off-highway vehicle, or the like vehicle.

Because the planet gear carrier supports the hub, there is no need for the stationary hollow axle to be a forging or pressing, in fact, this axle if desired may be dispensed with.

Furthermore, since the hub is rotatably supported on the planet gear carrier and no size restrictions are imposed on the cross-sectional area of the planet gear carrier, it will be appreciated that the planet gear carrier can be manufactured from a relatively low cost robust casting.

In the embodiment of the invention where the hub is supported on a hub axle projecting from the planet gear carrier, again because there is no restriction on the cross-sectional area of the hub axle this may also be manufactured from a low cost robust casting and in fact, cast integrally with the planet gear carrier.

Furthermore, because of the relatively simple construction of the mounting means and connecting means, the hub and epicyclic gear train can be readily and easily mounted in a steerable or non-steerable hub.

It will be appreciated that this is a major advance in the art, since up to this, in all known epicyclic gear trains, it has, in general, been necessary to support the hub on the hollow stationary axle which resulted in the earlier stated disadvantages. Accordingly, by retaining the planet gear carrier stationary and mounting the hub thereon, the need for a forged or pressed stationary axle has been eliminated. While it may appear to be relatively simple to do what has been done, it must be appreciated that epicyclic gear trains and the problems and disadvantages of their use in vehicles, where only low volume production runs are required, have been apparent for many years. However, none of those skilled in the art have ever attempted to overcome the disadvantages and problems by constructing an epicyclic gear train in which the hub is rotatably mounted on a stationary planet gear carrier. It should be appreciated that the present invention is not the mere rearrangement of integers of such an epicyclic gear unit, but rather a complete reversal of the normal functions of the planet gear carrier and the annulus gear of an epicyclic gear unit which would not be immediately obvious to those skilled in the art.

BRIEF DESCRIPTION OF THE DRAWINGS

The above and other objects and advantages of this invention will become apparent from the following detailed description of some embodiments of the invention described with reference to the accompanying drawings.

Figures 1, 2:
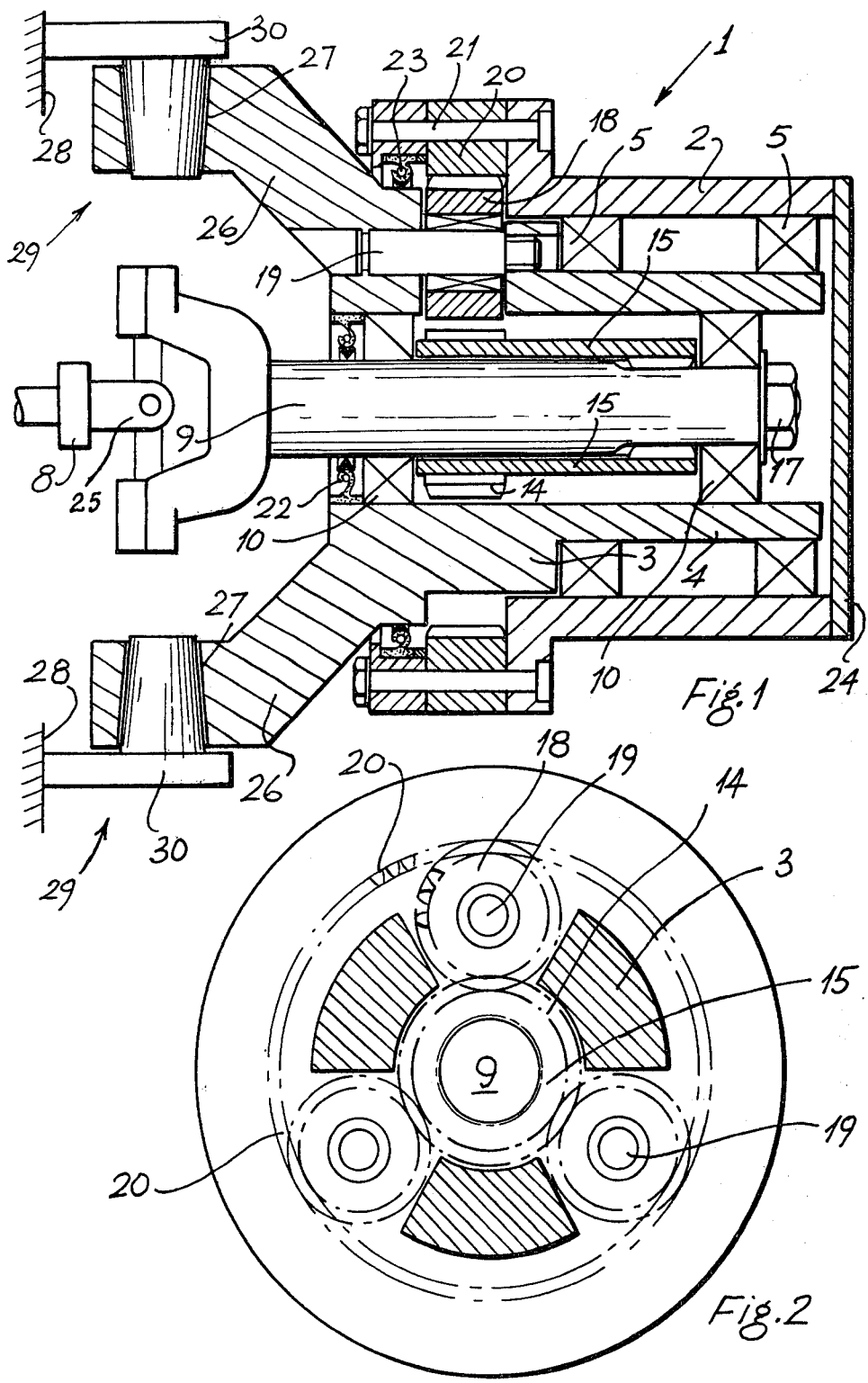
FIG. 1 is a sectional side view of a hub reduction gear unit according to the invention.
FIG. 2 is a sectional end view of the hub reduction gear unit of FIG. 1.

Referring to the drawings and initially to FIGS. 1 and 2 there is provided a hub reduction gear unit according to the invention indicated generally by the reference numeral 1 for mounting in a hub 2 of a vehicle (not shown). In this embodiment of the invention the hub 2 is steerable to steer the vehicle as will be described in more detail below.

The hub reduction gear unit includes a non-rotating planet gear carrier 3 of cast metal. A hub axle provided by a hollow shaft 4 also of cast metal and integral with the planet gear carrier projects from the planet gear carrier and rotatably supports the hub 2 on bearings 5.

A sun gear shaft 9 is rotatably mounted on bearings 10 in the planet gear carrier 3 and drives a sun gear 14 fast on a sleeve 15 which is in turn fast on the sun gear shaft 9. A nut 17 on the end of the shaft 9 retains the bearings 10, the sleeve 15 and the sun gear shaft 9 together. The sun gear drives three planet gears 18 rotatable on pins 19 projecting from the planet gear carrier 3. The hub 2 is driven by an annulus gear 20 meshing with the planet gears and retained fast on the hub 2 by screws 21. Oil seals 22 and 23 provide a seal between the planet gear carrier and the shaft and the hub respectively. A cover plate 24 is removably mounted on the hub 2 for inspection of the gears.

A connecting means to connect the sun gear shaft 9 to a drive shaft 8 is provided by a universal joint 25. The planet gear carrier 3 and in turn the hub 2 is connected to the vehicle housing, portions 28 of which are shown, by a mounting means provided by a pivot joint 29. The pivot joint 29 includes a pair of female members 26 of cast iron integral with the planet gear carrier 3. Holes 27 in the female members 26 engage male members 30 mounted on the vehicle housing 28. The holes 27 of the pivot joint 29 and universal joint 25 define a common pivot axis about which the hub is pivotal for steering of the vehicle.

In use, the drive shaft 8 drives the sun gear shaft 9. The hub 2 is driven through gears 14, 18 and 20 by the sun gear shaft. The vehicle (not shown) is steered by pivoting the hub about the common pivot axis of the pivot joint 29 and the universal joint 25.

Figure 3:
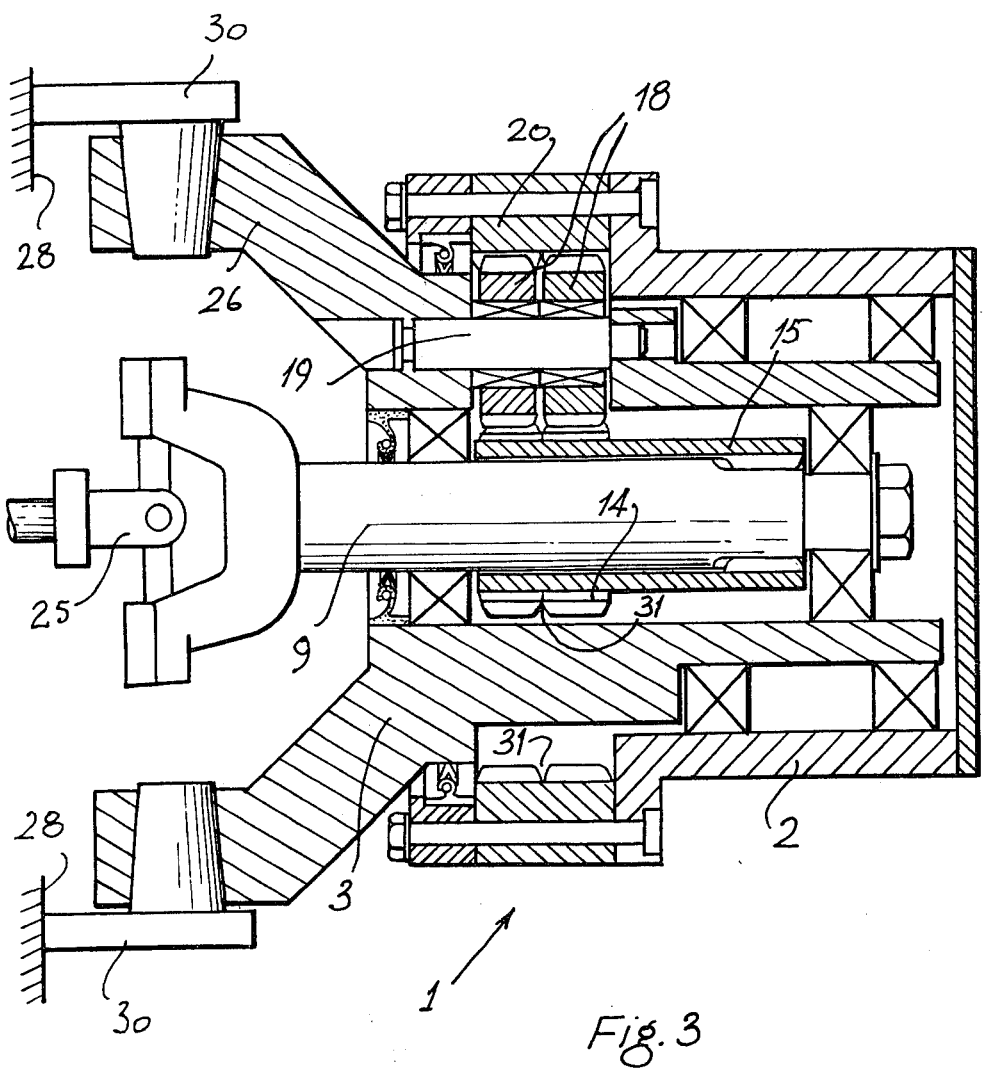
FIG. 3 is a view similar to FIG. 1 of a hub reduction gear unit according to another embodiment of the invention.

A hub reduction gear unit according to another embodiment of the invention is shown in FIG. 3. This hub reduction gear unit is substantially similar to that described with reference to FIGS. 1 and 2, like components being identified by the same reference numerals.

In this embodiment of the invention the sun gear is axially divided into two portions to provide a pair of sun gears 14 mounted side by side on the sun gear shaft 9. The sun gears 14 drive three corresponding pairs of planet gears 18 which in turn drive a corresponding pair of annulus gears 20. The annulus gears and sun gears are relieved at 31 corresponding to the position where the two planet gears 18 abut. By the use of pairs of gears the load transmitted by the gears can be balanced more evenly and distributed along the axis of the gears.

In similar manner the gears can be in pairs with opposite handed angles on the teeth of each gear to achieve a meshing effect of a herringbone train which will give a balanced end thrust.

In this arrangement it is envisaged that the sun gear would be driven from the sleeve by a spline.

Figure 4:
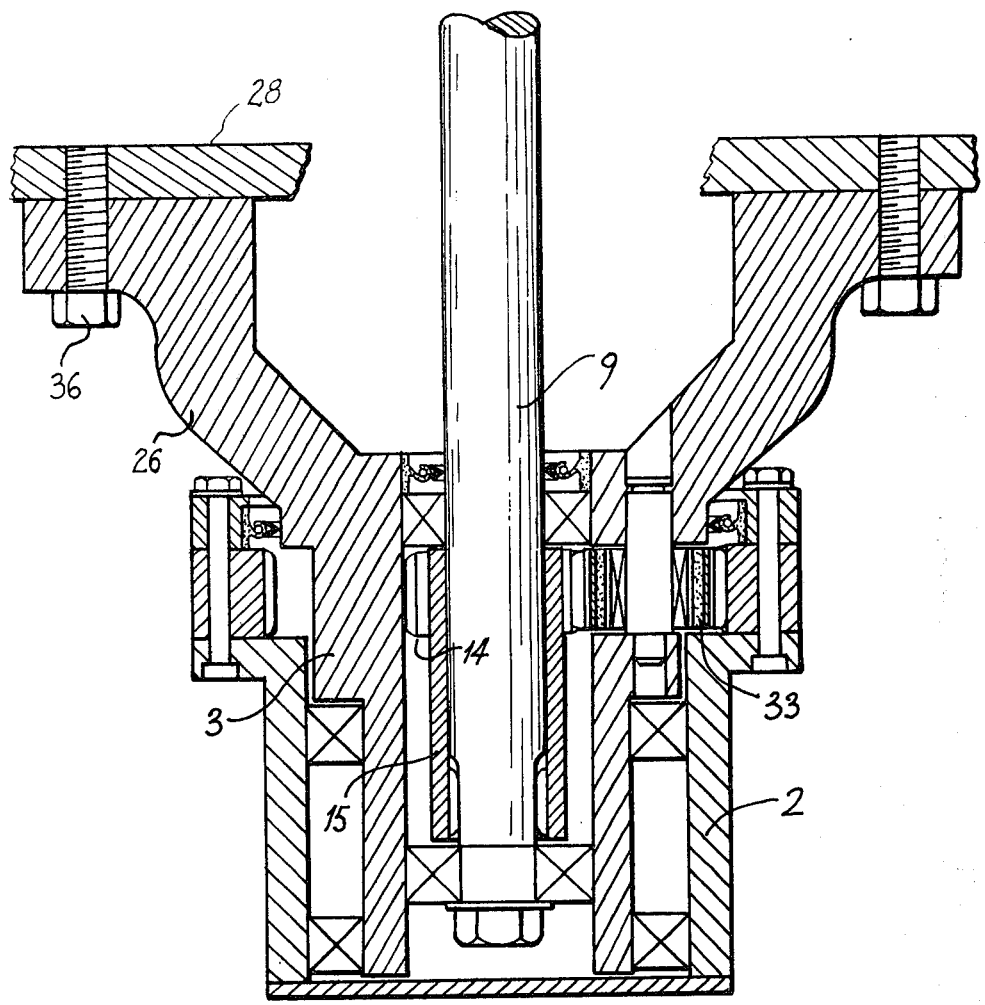
FIG. 4 is a view similar to FIG. 1 of a hub reduction gear unit according to a still further embodiment of the invention.

FIG. 4 shows a hub reduction gear unit according to another embodiment of the invention. The hub reduction gear unit is substantially similar to that described with reference to FIGS. 1 and 2 and like components are identified by like reference numerals. In this embodiment of the invention the hub is a non-steerable hub. The planet gear carrier 3 is rigidly mounted to the vehicle housing 28 by a mounting means provided by a housing 26 of the planet gear carrier 3 bolted by screws 36 to vehicle housing. The sun gear shaft is connected by a connection means provided by a shaft coupling (not shown). Also, in this embodiment of the invention the planet gears 18 are mounted on the pins 19 by means of flexible rings 33. This allows some freedom of relative movement between the gears. Similarly, if desired the annulus gear and/or the sun gear may be mounted on a flexible mounting.

It will be appreciated that although the sun gear is fast on a sleeve fast on the sun gear shaft, it could in fact be mounted directly on the sun gear shaft.

It will also be appreciated that although the hub is pivotal for steering of the vehicle it also could be pivotal about a substantially horizontal axis to accommodate independent suspension of the vehicle wheel.

It will further be appreciated that although a particular type of pivot and universal joint were described in the embodiment above any suitable joints could have been used.

Furthermore it will be appreciated that instead of rotatably mounting the hub on a shaft projecting from the planet gear carrier, the hub could have been rotatably mounted by any suitable arrangement on the planet gear carrier.

What I claim is:

1. A hub reduction gear unit for mounting in a hub of a vehicle to transmit drive from a drive shaft to the hub comprising:
   a non-rotating epicyclic planet gear carrier of cast metal cast in a single unitary piece,
   a hub axle of cast metal cast integrally in one piece with, and projecting outwardly from, the planet gear carrier and extending into the hub for the rotatable support thereof,
   a sun gear shaft coaxial with and rotatable within the planet gear carrier,
   a sun gear fast on the sun gear shaft,
   planet gears meshing with the sun gear and rotatably mounted on the planet gear carrier,
   an annulus gear meshing with the planet gears fast on and coaxial with the hub,
   a mounting means on the planet gear carrier to connect the carrier to the vehicle, and
   a connecting means on the sun gear shaft to connect the sun gear shaft to the drive shaft.

2. A hub reduction gear unit as recited in claim 1 in which the mounting means includes a pivot joint, and the connecting means includes a universal joint, both joints defining a common pivot axis transverse to the sun gear shaft for steering of the vehicle.

3. A hub reduction gear unit as defined in claims 1 or 2, wherein the mounting means comprises at least two members of cast metal cast integrally in one piece with, and projecting inwardly from the planet gear carrier, said members being adapted to be secured to a housing of the vehicle.

4. A hub reduction gear unit as recited in any of claims 1 or 2 in which the planet gears are flexibly mounted.

5. A hub reduction gear unit as recited in any of claims 1 or 2 in which the sun gear is cut at one end of a sleeve fast on the sun gear shaft.

6. A hub reduction gear unit as recited in any of claims 1 or 2 in which the planet gears are in two or more axially divided portions.

7. A hub reduction gear unit as recited in claim 6 in which the annulus gear and the sun gear is in two or more axially divided portions corresponding with the respective planet gears.

8. A hub reduction gear unit as recited in claim 7 in which the teeth of the two planet gears and their meshing sun and annulus gears are axially helical, one being left hand and the other being right hand.

* * * * *